(12) United States Patent
Ito et al.

(10) Patent No.: US 9,509,983 B2
(45) Date of Patent: Nov. 29, 2016

(54) IMAGE DISPLAY VIEWING SYSTEM AND IMAGE DISPLAY DEVICE

(75) Inventors: Atsushi Ito, Kanagawa (JP); Kyoichiro Oda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1132 days.

(21) Appl. No.: 12/880,925

(22) Filed: Sep. 13, 2010

(65) Prior Publication Data

US 2011/0074935 A1 Mar. 31, 2011

(30) Foreign Application Priority Data

Sep. 29, 2009 (JP) ................ P2009-224014

(51) Int. Cl.
*H04N 13/04* (2006.01)
(52) U.S. Cl.
CPC ................ *H04N 13/0438* (2013.01)
(58) Field of Classification Search
USPC .......................................... 348/56
See application file for complete search history.

(56) References Cited

U.S. PATENT DOCUMENTS

| | | | | |
|---|---|---|---|---|
| 5,818,399 A * | 10/1998 | Omori et al. | ...................... | 345/8 |
| 5,976,017 A * | 11/1999 | Omori et al. | .................... | 348/52 |
| 6,243,207 B1 * | 6/2001 | Kawamura et al. | .......... | 348/121 |
| 7,123,213 B2 * | 10/2006 | Yamazaki et al. | ................ | 345/7 |
| 7,843,417 B2 * | 11/2010 | Fergason | ........................ | 345/89 |
| 2001/0043265 A1 * | 11/2001 | Tetterington et al. | .......... | 348/51 |
| 2001/0043266 A1 * | 11/2001 | Robinson et al. | ............. | 348/53 |
| 2008/0158095 A1 * | 7/2008 | Neidrich et al. | ................ | 345/6 |
| 2008/0198114 A1 * | 8/2008 | Roberts et al. | ................ | 345/88 |
| 2008/0316303 A1 * | 12/2008 | Chiu et al. | ..................... | 348/51 |
| 2009/0237495 A1 * | 9/2009 | Kawahara | ...................... | 348/56 |
| 2010/0060723 A1 * | 3/2010 | Kimura et al. | ................ | 348/56 |

FOREIGN PATENT DOCUMENTS

| | | |
|---|---|---|
| JP | 61-227498 | 10/1986 |
| JP | 3701355 | 7/2005 |
| WO | WO 2009069026 A3 * | 11/2009 |

\* cited by examiner

*Primary Examiner* — Jeffrey R Swearingen
(74) *Attorney, Agent, or Firm* — Oblon, McClelland, Maier & Neustadt, L.L.P.

(57) ABSTRACT

Systems, methods, and display apparatuses consistent with the invention may generate control signals to control n light-passing devices such that the n light-passing devices each are sequentially operated between ON and OFF states, and such that each of the n light-passing devices are in the ON state no less than 1/n of the viewing period. This may allow different images to be viewed through different light-passing devices. The embodiments may be used, for example, to present a three-dimensional image to a viewer or to present different videos to different viewers.

18 Claims, 8 Drawing Sheets

IMAGE DISPLAY VIEWING SYSTEM AND IMAGE DISPLAY DEVICE

BACKGROUND

Technological Field

The present invention relates to an image display viewing system and an image display device.

Description of the Related Art

Recently, a technology such as that described in Japanese Patent No. 3701355, for example, has become known that displays a plurality of video images on a single screen in a time-divided manner and that uses a pair of glasses with shutters that are synchronized to the timing of the displayed images in order to separate the plurality of the video images and recognize them individually. A technology such as that described in Japanese Patent Application Publication No. JP-A-61-227498 is also known that makes it possible to create a stereoscopic display by utilizing the aforementioned technology to display parallax images that respectively correspond to the left and right eyes.

These two technologies are substantially the same in terms of hardware, and they differ only in the video content they display and the operating of the shutters. That is, if the shutters that respectively correspond to the left and right eyes open and close in the same phase, the plurality of the video images can be selectively displayed, and if the shutters open and close in opposite phases, such that the two images serve as parallax images, the stereoscopic image can be displayed.

Incidentally, the vertical synchronization frequency of a television receiver is 60 Hz in the case of the NTSC system and 50 Hz in the case of the PAL and SECAM systems. Therefore, the pair of glasses with the shutters performs its opening and closing operations in synchronization at one of 60 Hz and 50 Hz.

At the same time, the frequencies of commercial power supplies that are used for external light sources such as an indoor fluorescent lamps and the like, for example, are the same 50 Hz and 60 Hz, and fluorescent lamps that are not of the inverter type flicker at double those frequencies, that is, 100 Hz and 120 Hz.

In a case where a fluorescent lamp and the pair of glasses with the shutters are used individually, the frequency is so high that the human eye does not perceive it, but if the fluorescent lamp is seen over the tops of the shutters, a flickering is perceived due to the difference in frequency between the operating frequency of the shutters and the flicker frequency of the fluorescent lamp. For example, in a case where a 60 Hz video signal is watched in an environment where the commercial frequency is 50 Hz, the flickering of the light is transmitted through the shutters at a frequency of one of 20 Hz and 40 Hz, which is the difference between the two frequencies, and is visually perceived. In this case, even if no flickering of the display screen itself is perceived, flickering is easily perceived in the area around the screen, such as on a wall that is illuminated by a fluorescent lamp, for example, and this will sometimes make a user feel uncomfortable.

SUMMARY

In light of the foregoing, it is desirable for the present invention to provide an image display viewing system and an image display device that are novel and improved and that, through the use of a simple structure, are capable of reliably inhibiting flickering of light from an external light source.

Consistent with one embodiment, a system for controlling viewing shutters is disclosed. The system may include a processor; a memory storing instructions for causing the processor to generate shutter control information including: information specifying an open period, of a first viewing shutter, that is greater than a display period of a first image, and information specifying an open period, of a second viewing shutter, that is greater than a display period of a second image; and a communication unit for transmitting the shutter control information to the viewing shutters.

Consistent with another embodiment, a method for generating viewing shutter control signals is disclosed. The method may include generating, by a processor, shutter control information including information specifying an open period, of a first viewing shutter, that is greater than a display period of a first image, and information specifying an open period, of a second viewing shutter, that is greater than a display period of a second image; and transmitting signals carrying the shutter control information.

According to the embodiments of the present invention that are described above, flickering of light from an external light source may be reliably suppressed by a simple configuration.

DETAILED DESCRIPTION OF EMBODIMENT

Figure 1:
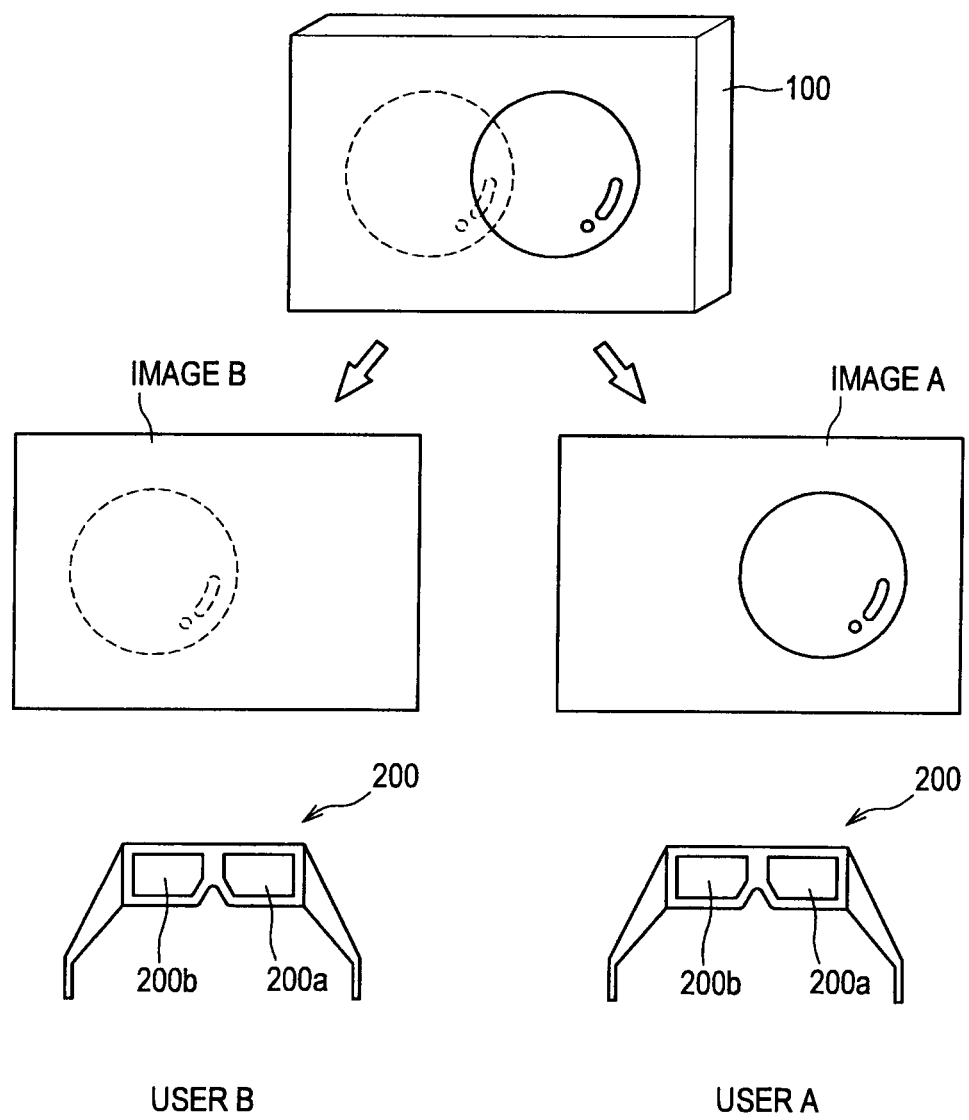
FIG. 1 is a schematic drawing that shows a configuration of a stereoscopic image display viewing system, consistent with an embodiment of the invention.

Hereinafter, embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention may be practiced by any one of a number of embodiments. For example, consistent with another embodiment, a display apparatus for displaying images to light-passing devices operable between ON and OFF states is disclosed. The display device may include a light source; a display device sequentially generating n images during a viewing period, wherein n is an integer greater than 1; a first control system for generating control signals to control n of the light-passing devices such that the n light-passing devices each are sequentially operated between ON and OFF states; and a second control system for controlling the light source such that light from the light source passing through the n light-passing devices is below a predetermined level during time periods when more than one of the n light-passing devices is in the ON state.

Consistent with another embodiment, a display apparatus for displaying images to light-passing devices operable between ON and OFF states is disclosed. The display apparatus may include a light source; a display device sequentially generating n images during a viewing period, wherein n is an integer greater than 1; and a control system for generating control signals to control n of the light-passing devices such that the n light-passing devices each are sequentially operated between ON and OFF states, wherein the control system generates control signals such that each of the n light passing devices are in the ON state no less than 1/n of the viewing period.

Consistent with another embodiment, a display apparatus for displaying images to light-passing devices operable between ON and OFF states is disclosed. The display apparatus may include a light source; a display device sequentially generating n images during a viewing period, wherein n is an integer greater than 1; and a control system for controlling the light source such that light from the light source passing through n of the light-passing devices is below a predetermined level during time periods when more than one of the n light-passing devices is in the ON state.

Note that the explanation will be in the order shown below.

1. Overall configuration of video image display system
2. Example of configuration of image display device
3. Causes of flicker
4. Specific configuration of video image display system according to the present embodiment
5. Application to system that cyclically displays a plurality of different images 1. Overall Configuration of Video Image Display System FIG. 1 is a schematic drawing that shows a configuration of a stereoscopic image display viewing system consistent with an embodiment of the present invention. As shown in FIG. 1, the system according to the present embodiment is provided with an image display device 100 that is configured from an LCD, as well as a pair of displayed image viewing glasses (optical modulators) 200. The image display device 100 can be driven at double speed and is provided with a drive circuit that drives a display panel and with a transmitter that receives a vertical synchronization signal from the drive circuit and outputs a signal to the displayed image viewing glasses 200. The displayed image viewing glasses 200 have a function that receives the signal that is transmitted from the transmitter of the image display device 100 and are also provided with liquid crystal shutters 200a, 200b that, based on the received signal, combine video images that are displayed on the display panel and select the video images by opening and closing.

The image display device 100 may be a time division type of stereoscopic video image display device, for example, and may display an image for the left eye and an image for the right eye on the entire display panel in alternation in an extremely short cycle. The image display device 100 may also synchronize the display cycles of the image for the left eye and the image for the right eye such that it provides the images separately to the left eye and the right eye. The image display device 100 may, for example, display an image A for the right eye and an image B for the left eye in separate fields. The pair of the liquid crystal shutters 200a, 200b are provided in portions of the displayed image viewing glasses 200 where lenses would normally be placed. The liquid crystal shutters 200a, 200b perform opening and closing operations in alternation, in synchronization with the switching of the images in the separate fields of the image display device 100. That is, for the field in which the image A for the right eye is displayed on the image display device 100, the liquid crystal shutter 200b for the left eye changes to a closed state, and the liquid crystal shutter 200a for the right eye changes to an open state. For the field in which the image B for the left eye is displayed, the opposite shutter operations are performed. Thus, the image display device 100 displays the image A and the image B in alternation in an extremely short cycle and simultaneously provides the images to the left eye and the right eye in synchronization with the display cycle for the image A and the image B.

This sort of operation causes only the image A to be visible to the right eye of a user who is wearing the viewing glasses 200 and looking at the image display device 100 and causes only the image B to be visible to the left eye of the user. The images for the right eye and the left eye are therefore combined in the user's brain, such that the images that are displayed on the image display device 100 are perceived stereoscopically. The image display device 100 can also display an ordinary two-dimensional image, and in that case, the switching of the image A and the image B is not performed.

2. Example of Configuration of Image Display Device

Figure 2:
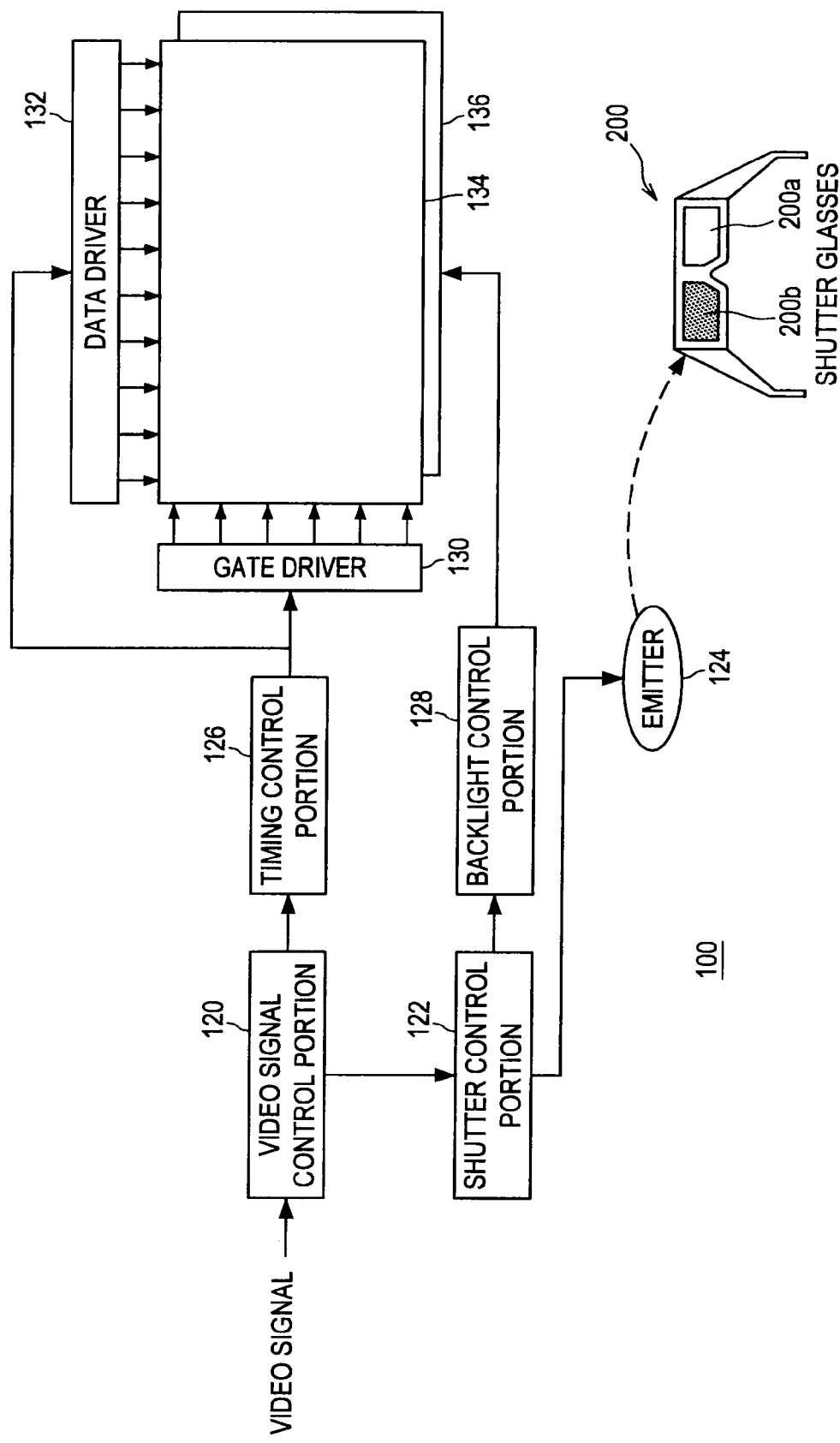
FIG. 2 is a block diagram that shows a configuration of an image display device.

Next, a configuration of the image display device 100 will be explained. FIG. 2 is a block diagram that shows the configuration of the image display device 100. As shown in FIG. 2, the image display device 100 is provided with a video signal control portion 120, a shutter control portion 122, an emitter 124, a timing control portion 126, a backlight control portion 128, a gate driver 130, a data driver 132, and a liquid crystal display panel 134. A backlight (surface light source) 136 is disposed behind the liquid crystal display panel 134.

The liquid crystal display panel 134 is configured from a liquid crystal layer, transparent electrodes on opposite sides of the liquid crystal layer, a color filter, and the like. A video signal for displaying the image A for the right eye and the image B for the left eye is input to the video signal control portion 120. The video signal control portion 120 outputs left and right video signals in alternation in order to cause the image A for the right eye and the image B for the left eye to be displayed alternately on the liquid crystal display panel 134.

The video signal for the right eye and the video signal for the left eye that are output by the video signal control portion 120 are input to the timing control portion 126. The timing control portion 126 takes the video signal for the right eye and the video signal for the left eye that are input and converts them into signals to be input to the liquid crystal display panel 134 and also generates pulse signals that are used in operations of the gate driver 130 and the data driver 132.

The signals that are converted by the timing control portion 126 are input to the gate driver 130 and the data driver 132, respectively. The gate driver 130 and the data driver 132 receive the pulse signals that are generated by the timing control portion 126 and cause the individual pixels in the liquid crystal display panel 134 to emit light based on the signals that are input. A video image is thus displayed on the liquid crystal display panel 134.

The video signal control portion 120 also transmits to the shutter control portion 122 a timing signal that indicates the timing for switching between the video signal for the right eye and the video signal for the left eye. Based on the timing signal that is transmitted from the video signal control portion 120, the shutter control portion 122 transmits to the emitter 124 a drive signal that causes the emitter 124 to emit light. The drive signal is a signal that includes the opening and closing timings for the liquid crystal shutters 200a, 200b, and the shutter control portion 122 controls the opening and closing timings for the liquid crystal shutters 200a, 200b according to the signal that is transmitted from the video signal control portion 120. Based on the drive signal that is transmitted from the shutter control portion 122, the emitter 124 transmits to the viewing glasses 200 an optical signal that indicates the opening and closing timings for the right and left liquid crystal shutters 200a, 200b. Note that as a way of including the timing of the switching between the image A and the image B, the drive signal that causes the emitter 124 to emit light may also use a value that is stored in the displayed image viewing glasses 200 and that indicates the open periods for the liquid crystal shutters 200a, 200b.

The displayed image viewing glasses 200 are provided with sensors that receive optical signals, although these will not be explained in detail. Upon receiving the optical signals, the displayed image viewing glasses 200 perform the opening and closing operations of the liquid crystal shutters 200a, 200b in synchronization with the opening and closing timings for the liquid crystal shutters 200a, 200b that are indicated by the optical signals.

The shutter control portion 122 also transmits to the backlight control portion 128 a timing signal that indicates the timing of the switching between the left and right images. Based on the timing signal that is input, the backlight control portion 128 outputs a control signal for causing the backlight 136 to turn on. The backlight 136 turns on based on the control signal that is input from the backlight control portion 128.

Note that a liquid crystal display device is used as an example of the image display device 100, but the present invention is not limited to this example, and any device that is capable of displaying at an integral multiple of a television vertical synchronization frequency, such as a CRT, a PDP, and EL, or the like, may be used as the image display device 100.

The liquid crystal shutters 200a, 200b of the displayed image viewing glasses 200 may be configured from liquid crystal shutters having TN liquid crystals, for example, and the transmissivity and non-transmissivity of light through the shutters can be selected by turning a voltage on and off.

Figure 3:
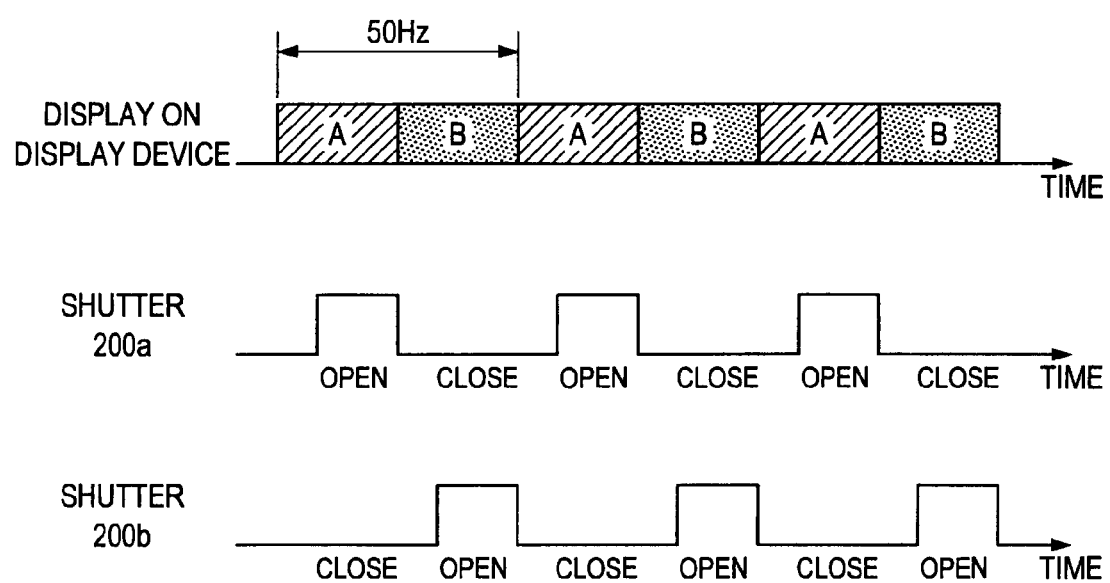
FIG. 3 is a timing chart that shows timings of displays of video images on the image display device and opening and closing timings of liquid crystal shutters.

FIG. 3 is a timing chart that shows the timings of the displays of the video images on the image display device 100 and the opening and closing timings of the liquid crystal shutters 200a, 200b. As shown in FIG. 3, the video images that are displayed on the image display device 100 are classified into the image A for the right eye and the image B for the left eye, and an observer sees the image A while the liquid crystal shutter 200a is open and sees the image B while the liquid crystal shutter 200b is open. The source of the video images that are displayed may be a 50 Hz NTSC (National Television Standards Committee) source, for example.

First, the image A starts to be displayed on the image display device 100, and at a point in time when the liquid crystal response time has elapsed and the image A is completely displayed, the liquid crystal shutter 200a changes to the open state. This allows the right eye of the observer to perceive the image A. Next, when the image B starts to be displayed, the liquid crystal shutter 200a changes to the closed state, such that the transmission of the image B through the liquid crystal shutter 200a is cut off (blocked).

Next, when the image B is completely displayed, the liquid crystal shutter 200b changes to the open state, and the left eye of the observer perceives the image B. Because the image A and the image B are thus perceived in alternation, the parallax difference between the image A and the image B allows the observer to perceive a stereoscopic image.

The periods of time during which the liquid crystal shutters 200a, 200b are each open are determined by the image display device 100 and the response speed of the liquid crystal shutters 200a, 200b. In the present embodiment, the time is set to five milliseconds as an example. The opening and closing timings of the liquid crystal shutters 200a, 200b are determined by the characteristics of the image display device 100, and the actual opening and closing timings and the method of displaying the images A, B can be adjusted as desired.

As described above, the displaying of the images A, B in alternation on the single image display device 100 and the opening and closing of the liquid crystal shutters 200a, 200b of the displayed image viewing glasses 200 in synchronization with the displaying of the images make it possible for the observer to perceive a stereoscopic image.

3. Causes of Flicker

Next, a relationship between the liquid crystal shutters 200a, 200b and a fluorescent lamp (an external light source) that is used for indoor lighting will be explained based on FIG. 4. In the present embodiment, an example is used in which the frequency of a commercial power supply that allows the fluorescent lamp to emit light is 50 Hz and the time that the shutters are open for displaying the two images that are based on the NTSC signal is set to five milliseconds.

The fluorescent lamp is not an inverter type, but is one that uses a ballast. Because the ballast is used, the fluorescent lamp oscillates at 100 Hz, which is two times the commercial frequency of 50 Hz, so its cycle is ten milliseconds. In contrast, the liquid crystal shutters 200a, 200b open and close in alternation at 59.94 Hz vertical synchronization frequency of the NTSC system, so their cycle is 16.7 milliseconds. In other words, as shown in FIG. 4, the liquid crystal shutters 200a, 200b alternately open for periods of five milliseconds at intervals of 16.7 milliseconds.

Figure 4:
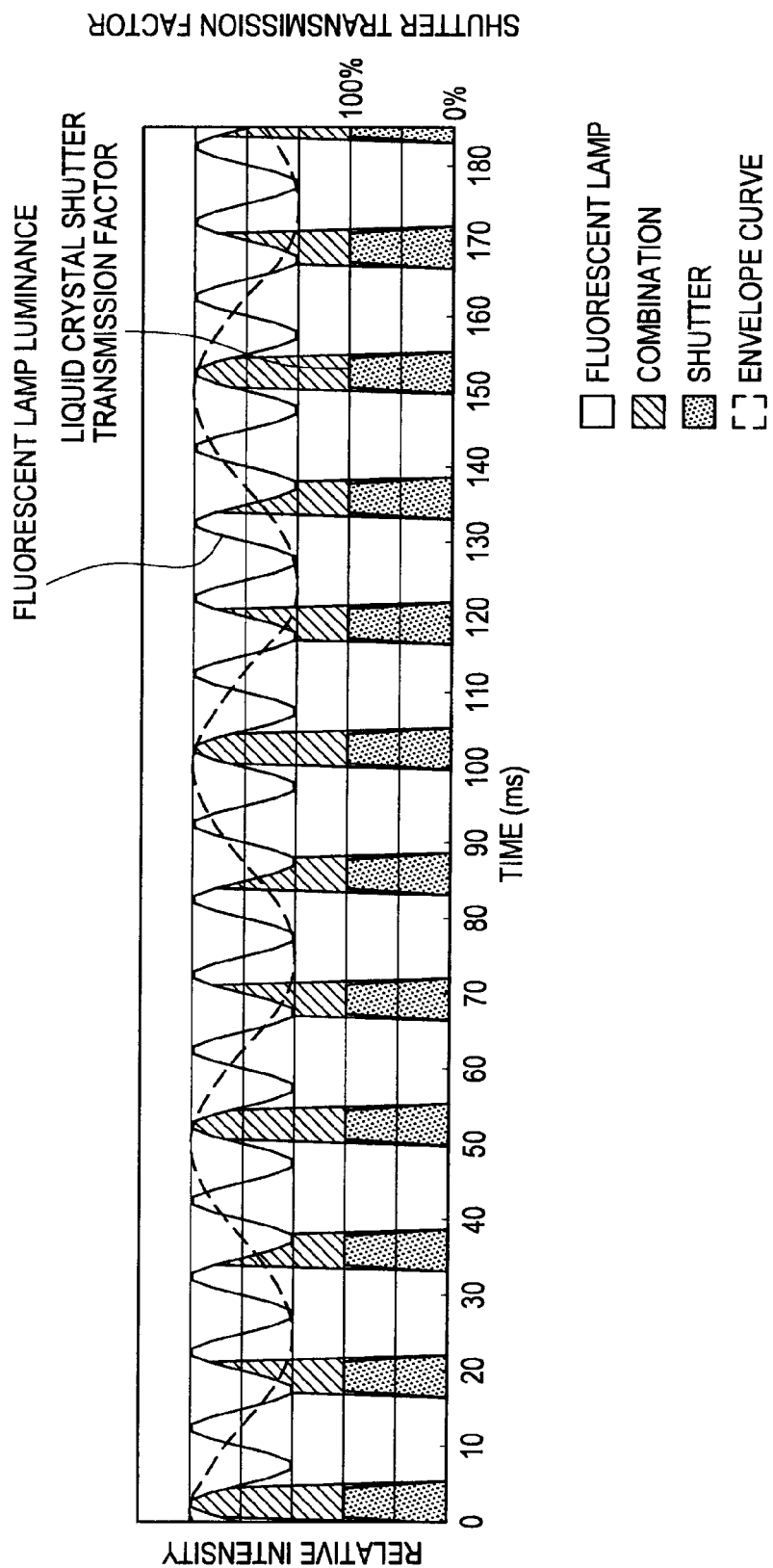
FIG. 4 is a characteristics diagram for explaining a relationship between the liquid crystal shutters and a fluorescent lamp (an external light source) that is used for indoor lighting.

FIG. 4 shows how the luminance (the relative intensity) of the fluorescent lamp and the transmission factor of the liquid crystal shutters 200a, 200b vary (from zero to 100% in this case) according to time. As shown in FIG. 4, the luminance of the fluorescent lamp varies in intensity on a ten-millisecond cycle. The transmission factor of the liquid crystal shutters 200a, 200b is varied cyclically by the opening and closing of the shutters on the 16.7-millisecond cycle. Due to the response characteristics of the liquid crystal shutters 200a, 200b, there exist transition periods that result from response delays from when the shutters start to open until they are completely open and from when they start to close until they are completely closed.

The amounts of light that pass through the liquid crystal shutters 200a, 200b and reach the eyes of the observer are expressed as the products of the luminance of the fluorescent lamp and the respective transmission factors of the liquid crystal shutters 200a, 200b, and they can be shown as relative intensities by the diagonally shaded areas in FIG. 4. The amount of light that the human eye senses is the value of the integral of the individual areas that are diagonally shaded in FIG. 4, but if this value is drawn as an envelope curve along the time axis, it shows an undulating waveform like that indicated by the broken line in FIG. 4. The frequency of the undulating waveform is derived by superimposing the difference between two times the frequency of the liquid crystal shutters 200a, 200b and the light emission frequency of the fluorescent lamp (2×59.94−100=19.88 Hz) and the difference between the frequency of the liquid crystal shutters 200a, 200b and the light emission frequency of the fluorescent lamp (100−59.94=40.06 Hz). Ordinarily, the human eye perceives flicker at a frequency no greater than 50 Hz to 60 Hz as a flickering of the light, so under the circumstances in which the (approximately 50 Hz) undulating waveform like that shown in FIG. 4 is generated, an easily recognizable flicker (flickering of the light) is perceived, and an impression of discomfort is given to the observer.

As described above, in a case where the light from a luminous body such as a fluorescent lamp or the like is perceived directly by an observer, the frequency is high, so it does not become a factor in flicker, but if the shutter operations by the liquid crystal shutters 200a, 200b are superimposed on the light, then flicker is perceived.

4. Specific Configuration of Video Image Display System According to the Present Embodiment The liquid crystal shutters 200a, 200b according to the present embodiment can be configured as sandwich structures, for example, in each of which twisted nematic (TN) crystals with a twist angle of ninety degrees are sandwiched between glass substrates, and with polarizing plates disposed on both of the exterior faces (the front and rear faces). Because the polarizing plates on both of the exterior faces are arranged such that their polarizing axes are perpendicular to one another, when a voltage is not applied to the liquid crystal layer, the direction of the polarized light that is propagated is rotated ninety degrees, in accordance with the twist of the liquid crystal molecules in the liquid crystal layer, such that each of the liquid crystal shutters 200a, 200b changes to a bright state in which the light that strikes each of the shutters passes through the polarizing plate on the rear face. In contrast, applying a specified voltage (for example, approximately ten volts) to the liquid crystal layer changes the liquid crystal layer to a polarized state, such that each of the liquid crystal shutters 200a, 200b changes to a dark state in which the light that strikes each of the shutters is absorbed by the polarizing plate on the rear face. In other words, the liquid crystal shutters 200a, 200b can be electrically switched between the two values of the bright state and the dark state.

Figure 5:
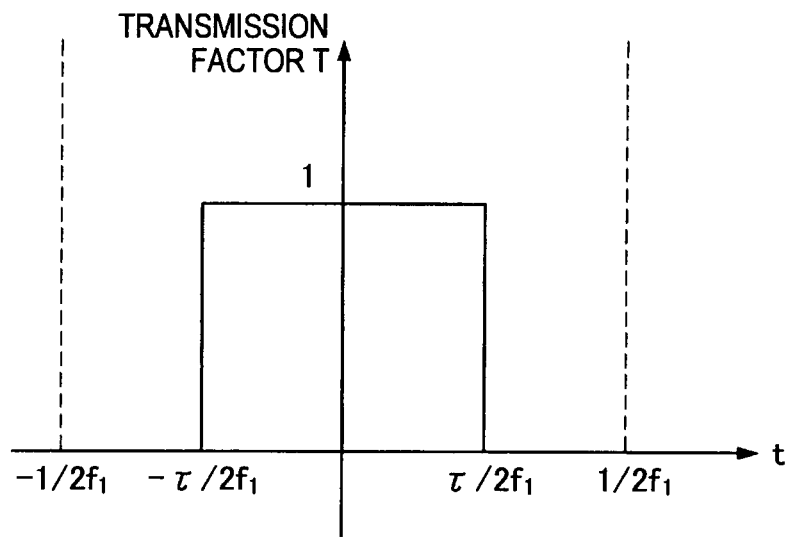
FIG. 5 is a characteristics diagram that shows an ideal waveform for a time response of the liquid crystal shutters.

In the present embodiment, the liquid crystal shutters 200a, 200b are used to view two screens' worth of video image information in accordance with an NTSC signal that has a frequency f1 of 59.94 Hz, for example. FIG. 5 is a characteristics diagram that shows a waveform of a time response of the liquid crystal shutters 200a, 200b. The liquid crystal shutters 200a, 200b repeatedly open and close at the frequency f1, so this can be expressed by a periodic function for which the period is the time 1/f1. If it is posited that the open ratio for the liquid crystal shutters 200a, 200b is τ, then as shown in FIG. 5, a function that expresses the operation of the liquid crystal shutters 200a, 200b is a rectangular function in which the bright state (transmission factor T=1 (100%)) occurs only during the period τ/f1, and the dark state (transmission factor T=0) occurs during all other periods. The function that is shown in FIG. 5 serves as a Fourier transform of a rectangular wave and can be expressed in general terms by the equation below.

$$T = \tau + \sum_{n=1}^{\infty} \frac{2}{n\pi} \sin(n\tau\pi)\cos(2n\pi f_1 t) \qquad \text{Equation 1}$$

In contrast, for the external light source, the case of the fluorescent lamp has been described above, but in order to reliably suppress the flicker, it is necessary to take into consideration all light sources that flicker as time elapses. Therefore, in the present embodiment, instead of using a fixed equation to express the external light source, the translate light source is expressed using a trigonometric function that has an amplitude A. Assuming that the frequency at which the undulation like that explained by FIG. 4 is generated is f2, the external light source G can be expressed by the equation below.

$$G = A \sin(2\pi f_2 t) + B \qquad \text{Equation 2}$$

The undulation phenomenon that was explained by FIG. 4 can be expressed by the product of the two equations above, and the amplitude of the nth order undulation is expressed by the equation below.

$$(n\text{th order})\text{amplitude} = (2A/n\pi)\sin(n\tau\pi)$$

According to the equation above that expresses the amplitude, n is the denominator, so with respect to a high-order undulation for which n is large, the amplitude is sufficiently small that its effect on the flicker is small. It is therefore possible to suppress the flicker by taking into consideration and suppressing only an order of undulation for which the value of n is low.

Thus, in a case where n=1 and the amplitude is at its greatest, the undulation amplitude will be at its lowest when τ=0 and τ=1. This refers to a state in which the open time of the liquid crystal shutters 200a, 200b is one of zero and 100%, that is, a state in which the liquid crystal shutters 200a, 200b are one of always closed and always open, so this is a state that cannot be achieved.

Accordingly, in the present embodiment, in the case the next amplitude, where n=2, a large value, the amplitude is suppressed. In the case where n=2, in order to minimize the undulation amplitude as shown by the broken line in FIG. 4, it is good for nτπ to equal π and for τ to equal 0.5. In other words, setting the open time of the liquid crystal shutters 200a, 200b to 50% makes it possible to eliminate the second-order mode undulation.

Figure 6:
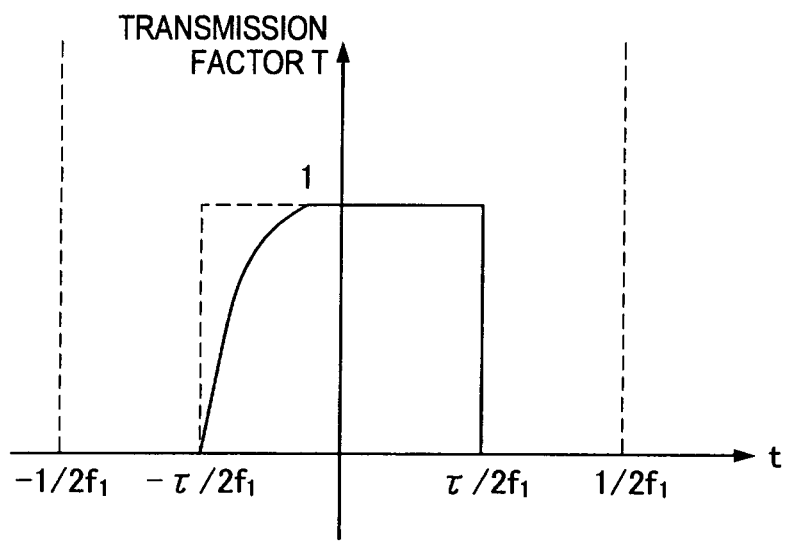
FIG. 6 is a characteristics diagram that shows an actual waveform for the liquid crystal shutters.

Therefore, in theory, setting the open ratio of the liquid crystal shutters 200a, 200b to 50% would make it possible to minimize undulation phenomena such as the flickering of the light. However, because there is a response delay in the transition between the closed state and the open state, the actual waveform for the liquid crystal shutters 200a, 200b is a waveform like that shown in FIG. 6, which is different from the ideal rectangular waveform that is shown in FIG. 5. In other words, in a case where the transmission factor transitions from 0 to 1, there is a limit to the actual response speed of the liquid crystals, so the waveform is a gently rising curve like that shown in FIG. 6. Therefore, the actual integral value for the opening time is less than the theoretical value. It is thought to be desirable for the actual integral value for the opening time to be approximately 50% in order to make the undulation amplitude as small as possible, so the actual shutter opening time t should be a slightly greater value than 0.5.

Figure 7:
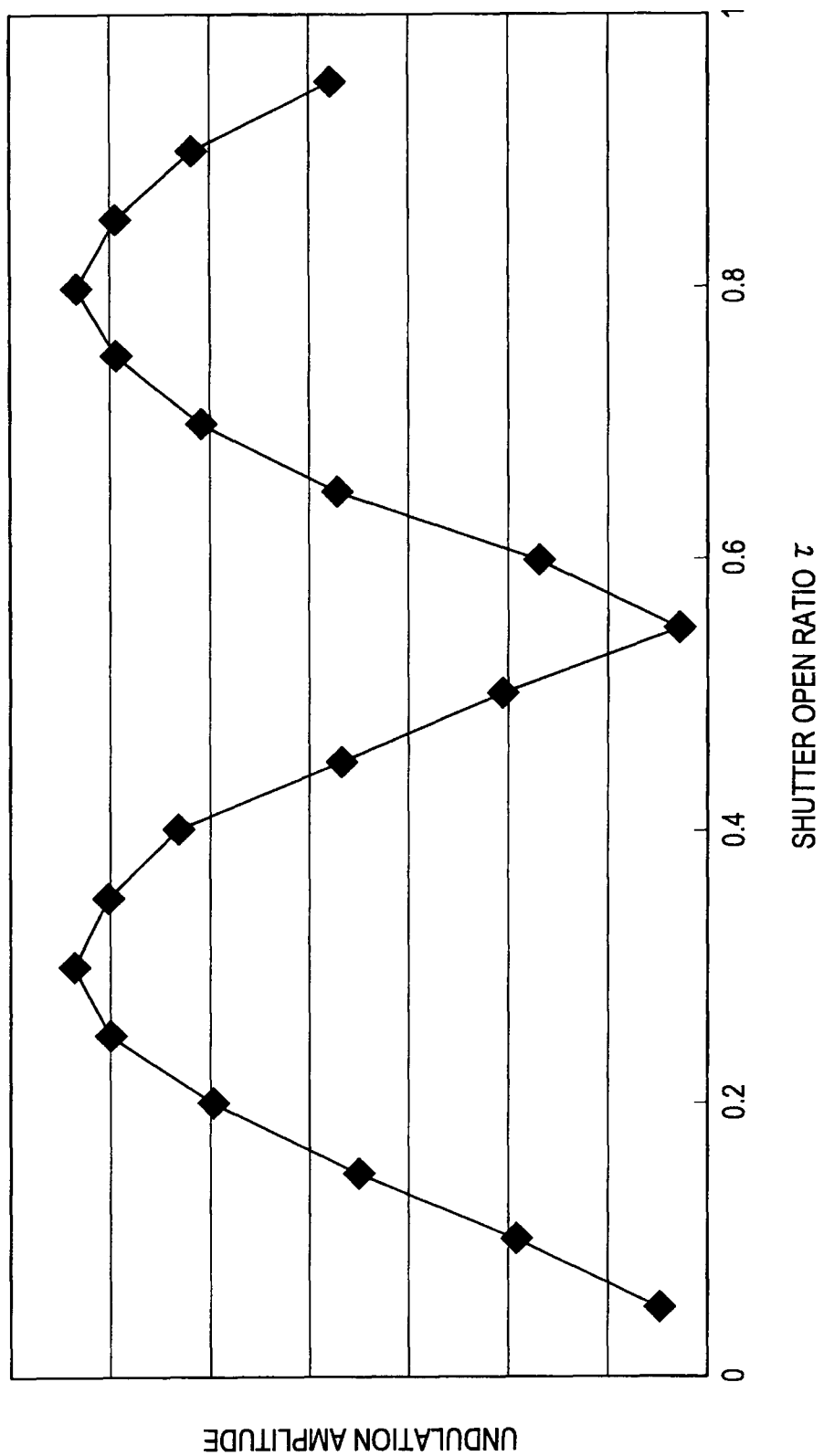
FIG. 7 is a characteristics diagram that shows results of an undulation amplitude simulation that is performed based on operation of the liquid crystal shutters at 60 Hz and on actual waveform data for a fluorescent lamp with a 50 Hz commercial power supply.

FIG. 7 is a characteristics diagram that shows results of a second-order mode undulation amplitude simulation that is performed based on operation of the actual liquid crystal shutters 200a, 200b at 60 Hz and on actual waveform data for the fluorescent lamp with the 50 Hz commercial power supply. In the results that are shown in FIG. 7, the second-order mode amplitude is obtained by subjecting the transmission characteristics of the liquid crystal shutters 200a, 200b to a Fourier transform. As shown in FIG. 7, results were obtained in which the second-order mode undulation amplitude reaches its minimum when the opening ratio is 55%. As shown in FIG. 7, results were obtained in which the value of the undulation amplitude increases rapidly when the opening ratio is less than 50% and when the opening ratio is greater than 60%. It is therefore possible to reduce the undulation amplitude reliably by making the opening ratio of the liquid crystal shutters 200a, 200b no less than 50% and no greater than 60%. Furthermore, in the results of a simulation that was performed while varying the frequency of the liquid crystal shutters 200a, 200b, it is clearly shown that the undulation is minimized by making the opening ratio of the liquid crystal shutters 200a, 200b no less than 50% and no greater than 60%.

In the case of an ordinary liquid crystal display device, a video image is not written to every individual pixel in the entire screen all at once, but is written in order in the vertical direction, starting from the top. Therefore, if the liquid crystal shutters 200a, 200b are operated with a shutter opening ratio of no less than 50%, a problem that is called cross-talk occurs in which the two types of images that are to be displayed are seen as being mixed together on the display screen. Accordingly, in the present embodiment, during the time when both of the liquid crystal shutters 200a, 200b are open, which is the period when the two types of video images that the image display device 100 displays are displayed mixed together, the backlight 136 is turned off, thus allowing the user to clearly perceive the two types of images separately, even though the opening ratio is not less than 50%.

Figure 8:
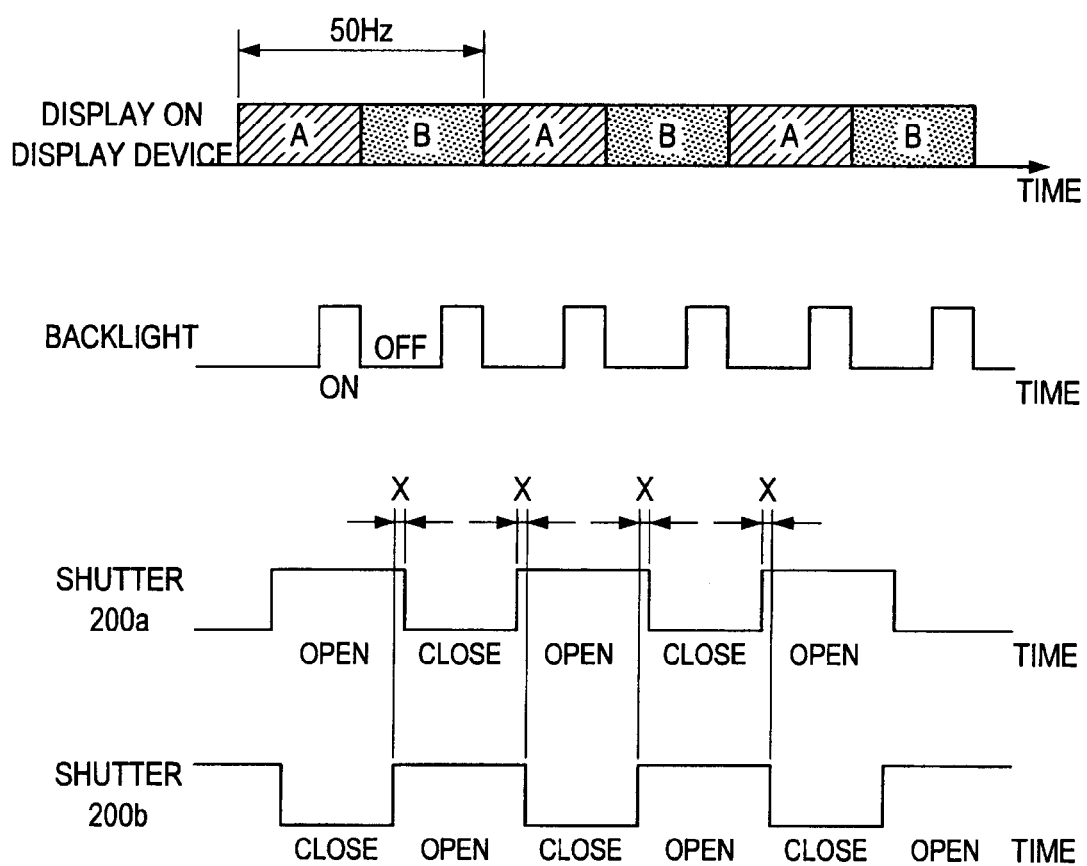
FIG. 8 is a timing chart that shows timings of displays of images A and B by the image display device according to the present embodiment, operation of a backlight, and operation of the liquid crystal shutters.

FIG. 8 is a timing chart that shows timings of the displays of the images A, B by the image display device 100 according to the present embodiment, the operation of the backlight 136, and the operation of the liquid crystal shutters 200a, 200b. As shown in FIG. 8, when the liquid crystal shutters 200a, 200b are operated with a shutter opening ratio of no less than 50%, periods X occur during which the liquid crystal shutters 200a, 200b are both in the open state. In the present embodiment, the control by the backlight control portion 128 turns the backlight 136 from the on state to the off state during the periods X when the liquid crystal shutters 200a, 200b are both in the open state. Therefore, even in a case where the shutter opening ratio is not less than 50%, the images A, B are not perceived by the user when they are mixed together, and a good display state without any cross-talk can be ensured.

During this process, the shutter control portion 122 that is shown in FIG. 2 generates the opening and closing timing signals for the liquid crystal shutters 200a, 200b such that the opening ratio for each of the liquid crystal shutters 200a, 200b is not less than 50%. Furthermore, during the periods X when the open period for the liquid crystal shutter 200a and the open period for the liquid crystal shutter 200b overlap, the backlight control portion 128 performs the control that turns off the backlight 136.

Note that in the explanation above, a configuration in which the backlight 136 is turned off during the periods X when the liquid crystal shutters 200a, 200b are both in the open state is used as an example, but the present invention is not limited to this example, and a different configuration can also be used in which the left and right images are not mixed together during the periods X. For example, the cross-talk between the left and right images may also be suppressed by a configuration in which a second shutter is set on the liquid crystal display panel 134 of the image display device 100 and the second shutter closes during the periods X when the liquid crystal shutters 200a, 200b are both in the open state.

The liquid crystal shutters 200a, 200b of the displayed image viewing glasses 200 according to the present embodiment have been explained using an example of liquid crystals that are in a normally white mode in which light passes through them when a voltage is not being applied. However, liquid crystals that are in a normally black mode in which light is blocked when a voltage is not being applied can also be used. In that case, the contrast between when the liquid crystal shutters 200a, 200b are open and when they are closed can be further improved. On the other hand, in the case where the liquid crystals that are in the normally white mode are used, the transmissivity can be made greater during the time when the light is being transmitted.

In addition, in one embodiment, the relationship between the NTSC signal and the 50 Hz commercial frequency was explained, but the same sorts of relationships exist between systems other than NTSC, such as PAL (Phase Alternation by Line) and SECAM (Séquentiel couleur à mémoire), and commercial frequencies of 50 Hz, 60 Hz, and the like. Even in those cases, the configuration in the present embodiment makes it possible to suppress the flicker reliably.

Therefore, significant improvement can be made in suppressing the undulation phenomenon between the shutters that open and close cyclically in synchronization with the video signal and the external light source that repeatedly turns on and off in a cycle that is close to the opening and closing cycle of the shutters. The external light source is not limited to being the fluorescent lamp, but the same sort of flicker occurs even with LED illumination, illumination by display devices of various types of audio-video equipment, and the like. However, the flicker can be reliably suppressed by the configuration in the present embodiment. Among these external light sources, there are cases in which the individual devices have their own characteristic frequencies instead of the commercial frequencies, but the flicker can be reliably suppressed by the configuration in the present embodiment even for these external light sources.

Figure 9:
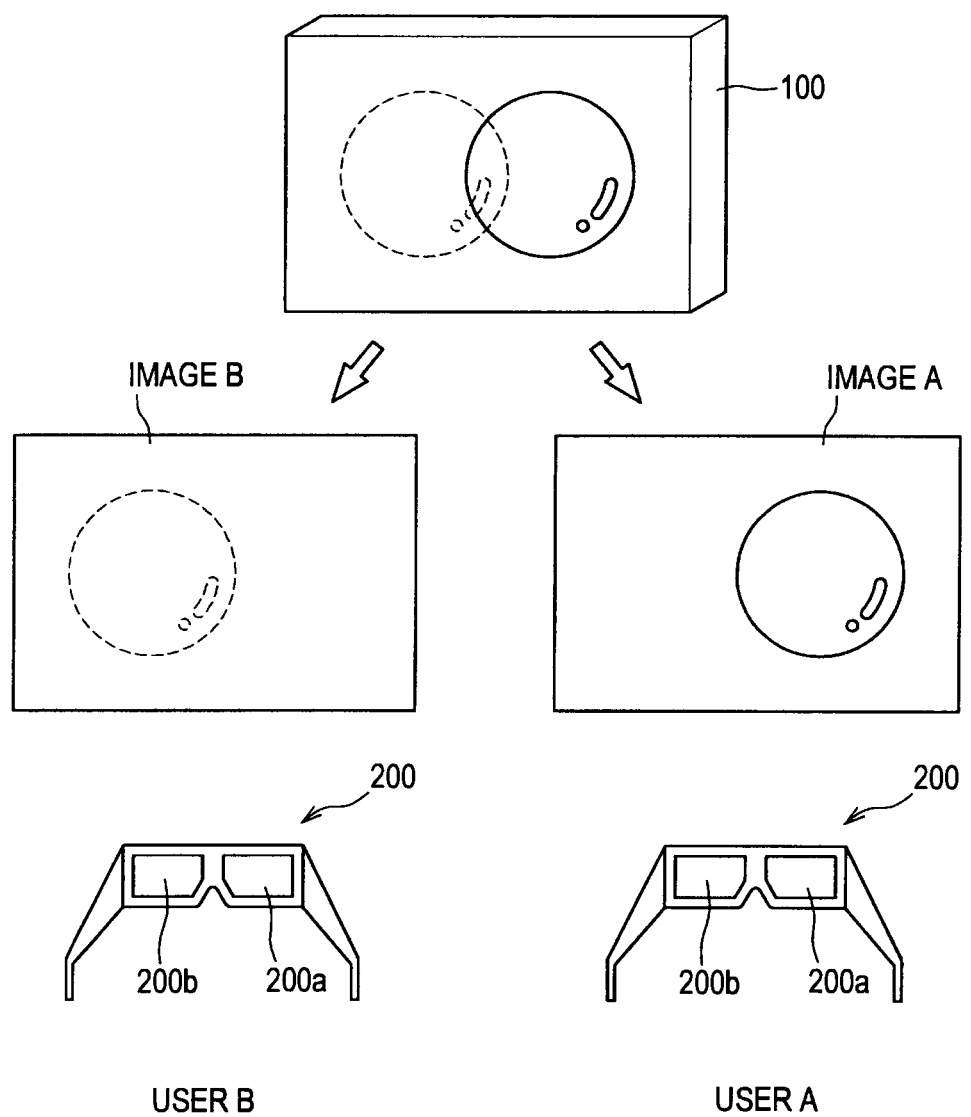
FIG. 9 is a schematic drawing that shows a (dual view) system that provides different video images to a plurality of users.

5. Application to System that Cyclically Displays a Plurality of Different Images In the example that is described above, the stereoscopic image display viewing system is used as an example, but the present invention can be applied to any system that provides different video images to a plurality of users. FIG. 9 is a schematic drawing that shows a (dual view) system that provides different video images to a plurality of users. In this system, the liquid crystal shutters 200a, 200b of the displayed image viewing glasses 200 perform their opening and closing operations with the same timing. The image display device 100 may be a time division type of display device, for example, and may display a video image for a user A and a video image for a user B on the entire screen in alternation in an extremely short cycle.

In this case, in FIG. 3, the two types of images that are displayed on the image display device 100 are the image A for the user A and the image B for the user B, and of the two users, the user A perceives the image A, and the user B perceives the image B. The source of the video images that are displayed may be a 60 Hz NTSC source, for example.

The liquid crystal shutters 200a, 200b perform their opening and closing operations simultaneously, in synchronization with the switching of the images in the separate fields of the image display device 100. In other words, in FIG. 3, if the image A is the image for the user A, and the image B is the image for the user B, then for the field in which the image A is displayed on the image display device 100, the liquid crystal shutters 200a, 200b of the displayed image viewing glasses 200 that the user A is wearing are both in the open state. In contrast, the liquid crystal shutters 200a, 200b of the displayed image viewing glasses 200 that the user B is wearing are both in the closed state.

More specifically, first, in FIG. 3, the image A starts to be displayed on the image display device 100, and at a point in time when the liquid crystal response time has elapsed and the image A is completely displayed, the liquid crystal shutters 200a, 200b for the user A change to the open state. This makes it possible for the user A to perceive the image A. Next, when the image B starts to be displayed on the image display device 100, the liquid crystal shutters 200a, 200b for the user A change to the closed state, such that the transmission of the image B through the liquid crystal shutters 200a, 200b is cut off (blocked).

Next, for the field in which the image B is displayed on the image display device 100 for the user B, the liquid crystal shutters 200a, 200b of the displayed image viewing glasses 200 that the user B is wearing both changes to the open state. In contrast, the liquid crystal shutters 200a, 200b of the displayed image viewing glasses 200 that the user A is wearing both changes to the closed state.

That is, when the image B is completely displayed, the liquid crystal shutters 200a, 200b for the user B change to the open state, and the user B can perceive the image B. In contrast, the liquid crystal shutters 200a, 200b of the displayed image viewing glasses 200 that the user A is wearing both changes to the closed state, so the user A cannot perceive the image B.

Thus the image display device 100 displays the image A for the user A and the image B for the user B on the entire screen in alternation in an extremely short cycle, and the liquid crystal shutters 200a, 200b for each of the users open and shut in synchronization with the display timing for the image A and the image B. This makes it possible to provide different images to the user A and the user B. Note that in FIG. 9, a case of two users is used as an example, but the same sort of configuration can also be used in a case where there are more users. In the example that is described above, two types of video images are displayed, so the images are displayed by dividing a single vertical synchronization period into two parts, but it is also possible to display no less than three video images simultaneously by dividing the vertical synchronization period into no less than three parts, thus providing different images to a greater number of users.

The basic configuration of the image display device 100 in the system that is shown in FIG. 9 is the same as that shown in FIG. 2. The video signal control portion 120 functions such that it controls the video image signals for the plurality of users, and the video signals for displaying the image A and the image B are input to the video signal control portion 120. The video signal control portion 120 causes the image A and the image B to be displayed in alternation on the liquid crystal display panel 134, so it also outputs the video signals for displaying the image A and the image B in alternation.

The video signal for the image A and the video signal for the image B that are output by the video signal control portion 120 are input to the timing control portion 126. The timing control portion 126 takes the video signals that are input and converts them into signals to be input to the liquid crystal display panel 134 and also generates pulse signals that are used in the operations of the gate driver 130 and the data driver 132.

The video signal control portion 120 also transmits to the shutter control portion 122 a timing signal that indicates the timing for switching between the video signal for the image A and the video signal for the image B that are output in consecutive pairs. Based on the timing signal that is transmitted from the video signal control portion 120, the shutter control portion 122 transmits to the emitter 124 the drive signal that causes the emitter 124 to emit light. The drive signal that causes the emitter 124 to emit light is a signal that includes the opening and closing timings for the liquid crystal shutters 200a, 200b for the individual users. The shutter control portion 122 controls the opening and closing timings for the liquid crystal shutters 200a, 200b based on the timing signal that is transmitted from the video signal control portion 120. Based on the drive signal that is transmitted from the shutter control portion 122, the emitter 124 transmits to the viewing glasses 200 an optical signal that indicates the opening and closing timings for the right and left liquid crystal shutters 200a, 200b. The shutter control portion 122 also transmits to the backlight control portion 128 the timing signal that indicates the timing for the switching between the image A and the image B.

Further, in the configuration in FIG. 9, the shutter control portion 122 also generates the timing signals such that the opening ratio for each of the liquid crystal shutters 200a, 200b is not less than 50%. Furthermore, during the periods X when the open period for the liquid crystal shutters 200a, 200b for the user A and the open period for the liquid crystal shutters 200a, 200b for the user B overlap, the backlight control portion 128 performs the control that turns off the backlight 136.

According to another embodiment, making the opening ratios of the liquid crystal shutters 200a, 200b no less than 50% makes it possible to keep to a minimum the undulation phenomenon (the flickering of the light) that is due to the external light source and the opening operations of the liquid crystal shutters 200a, 200b. Furthermore, when the opening ratios of the liquid crystal shutters 200a, 200b are made no less than 50%, turning off the backlight 136 of the image display device 100 makes it possible to inhibit the mixing together of the images during the periods when the open states of the shutters overlap.

A embodiments consistent with the present invention has been explained in detail above with reference to the attached drawings, the present invention is not limited to these examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-224014 filed in the Japan Patent Office on Sep. 29, 2009, the entire content of which is hereby incorporated by reference.

What is claimed is:

1. A system for controlling viewing shutters, comprising:
   processing circuitry configured to:
   generate shutter control information including first information specifying a first open period of a first viewing shutter of the viewing shutters and second information specifying a second open period of a second viewing shutter of the viewing shutters, the first open period being greater than a display period of a first image, the second open period being greater than a display period of a second image and the first open period and the second open period overlap each other in an overlap period;
   transmit the shutter control information to the viewing shutters; and
   generate backlight control information to control a backlight to turn to an off state during the overlap period, wherein
   the first open period and the second open period are greater than 50% and no greater than 60% of a viewing period in which the first image and the second image are displayed.

2. The system of claim 1, wherein the processing circuitry is configured to generate display control information to:
   inhibit display of the first image during the second open period; and
   inhibit display of the second image during the first open period.

3. The system of claim 2, wherein the processing circuitry is configured to control the backlight of the display to inhibit the display of the first and second images.

4. The system of claim 2, wherein the processing circuitry is configured to close a shutter of the display displaying the first and second images to inhibit the display of the first and second images.

5. The system of claim 1, wherein
   the first image is associated with the first viewing shutter, and
   the second image is associated with the second viewing shutter.

6. The system of claim 1, wherein the first and second images result in a three-dimensional image to a viewer.

7. The system of claim 6, wherein the processing circuitry is configured to transmit the shutter control information to the viewing shutters worn by the viewer.

8. The system of claim 1, wherein
   the processing circuitry is configured to control display, on the display, a plurality of first images constituting a first video and a plurality of second images constituting a second video,
   the first viewing shutter is associated with a first viewing device worn by a first viewer, and
   the second viewing shutter is associated with a second viewing device worn by a second viewer.

9. The system of claim 1, wherein the display is one of a liquid crystal display, a cathode ray tube display, a plasma display panel, a digital light processing display, a light-emitting diode display, or an electroluminescence display.

10. A method for generating viewing shutter control signals, the method comprising:
    generating, by processing circuitry, shutter control information including first information specifying a first open period of a first viewing shutter of viewing shutters and second information specifying a second open period of a second viewing shutter of the viewing shutters, the first open period being greater than a display period of a first image, the second open period being greater than a display period of a second image and the first open period and the second open period overlap each other in an overlap period;
    transmitting the shutter control information to the viewing shutters;
    controlling a sequential display, on a display, the first and second images during a viewing period, wherein the first open period and the second open period are greater than 50% and no greater than 60% of the viewing period; and
    controlling a backlight of the display to turn to an off state during the overlap period.

11. The method of claim 10, wherein
    the first image is associated with the first viewing shutter, and
    the second image is associated with the second viewing shutter.

12. The method of claim 10, further comprising generating display control information for inhibiting display of the first image during the second open period, and inhibiting display of the second image during the first open period.

13. The method of claim 12, wherein inhibiting display of the first and second images comprises controlling the backlight of the display.

14. The method of claim 12, wherein inhibiting display of the first and second images comprises closing a shutter of the display device displaying the first and second images.

15. The method of claim 10, wherein the first and second images result in a three-dimensional image to a viewer.

16. The method of claim 15, wherein transmitting the shutter control information comprises transmitting the shutter control information to the viewing shutters worn by the viewer.

17. The method of claim 10, further comprising:
    controlling display, on the display, a plurality of first images constituting a first video and a plurality of second images constituting a second video, wherein
    the first viewing shutter is associated with a first viewing device worn by a first viewer, and
    the second viewing shutter is associated with a second viewing device worn by a second viewer.

18. The method of claim 10, wherein the display is one of a liquid crystal display, a cathode ray tube display, a plasma display panel, a digital light processing display, a light-emitting diode display, or an electroluminescence display.

* * * * *